(12) United States Patent
Makino

(10) Patent No.: US 9,102,226 B2
(45) Date of Patent: Aug. 11, 2015

(54) MOTOR DRIVE APPARATUS FOR VEHICLE AND MOTOR VEHICLE

(75) Inventor: Tomoaki Makino, Iwata (JP)

(73) Assignee: NTN Corporation, Osaka (JP)

( * ) Notice: Subject to any disclaimer, the term of this patent is extended or adjusted under 35 U.S.C. 154(b) by 29 days.

(21) Appl. No.: 13/393,561

(22) PCT Filed: Aug. 26, 2010

(86) PCT No.: PCT/JP2010/064442
§ 371 (c)(1),
(2), (4) Date: Mar. 1, 2012

(87) PCT Pub. No.: WO2011/030670
PCT Pub. Date: Mar. 17, 2011

(65) Prior Publication Data
US 2012/0158233 A1   Jun. 21, 2012

(30) Foreign Application Priority Data

Sep. 8, 2009 (JP) ................................ 2009-207123
Sep. 8, 2009 (JP) ................................ 2009-207191

(51) Int. Cl.
*B60W 20/00* (2006.01)
*B60W 10/08* (2006.01)
(Continued)

(52) U.S. Cl.
CPC . *B60K 6/52* (2013.01); *B60K 6/383* (2013.01); *B60K 6/547* (2013.01); *B60K 17/356* (2013.01);
(Continued)

(58) Field of Classification Search
CPC ......... F16D 41/06; F16H 3/083; F16H 61/00; B60L 15/00; B60L 2240/443; Y10S 180/00
USPC .................... 701/22; 475/150; 180/65.7
See application file for complete search history.

(56) References Cited

U.S. PATENT DOCUMENTS 4,817,451 A   4/1989   Weismann
5,224,393 A   7/1993   Ashikawa et al.
(Continued)

FOREIGN PATENT DOCUMENTS

EP   0 456 511   11/1991
EP   1 519 084   3/2005
(Continued)

OTHER PUBLICATIONS

European Search Report issued Mar. 5, 2014 in a corresponding European application (in English).
(Continued)

*Primary Examiner* — Helal A Algahaim
*Assistant Examiner* — Michael Fouche
(74) *Attorney, Agent, or Firm* — Wenderoth, Lind & Ponack, L.L.P.

(57) ABSTRACT

A motor drive apparatus for a vehicle is provided which can prevent its transmission and motor from being rotated by vehicle wheels, and which allows quick gear change. This apparatus includes an electric motor (10), a first shaft (21) driven by the electric motor (10), a second shaft (22), first and second reduction gear trains (23 and 24) disposed between the first and second shafts (21 and 22). Two-way roller clutches (30A and 30B) are mounted between a first output gear (23*b*) of the first reduction gear train (23) and the second shaft (22) and between a second output gear (24*b*) of the second reduction gear train (24) and the second shaft (22), respectively. Gear changes are made by selectively engaging and disengaging the two-way roller clutches (30A and 30B) with a speed changing mechanism (50).

14 Claims, 14 Drawing Sheets

(51) Int. Cl.
| | |
|---|---|
| B60K 6/52 | (2007.10) |
| B60K 6/383 | (2007.10) |
| B60K 6/547 | (2007.10) |
| B60K 17/356 | (2006.01) |
| F16D 41/08 | (2006.01) |
| F16H 3/10 | (2006.01) |
| F16H 63/30 | (2006.01) |
| B60L 11/12 | (2006.01) |
| B60L 11/14 | (2006.01) |
| B60L 15/20 | (2006.01) |
| B60K 1/00 | (2006.01) |
| B60K 17/16 | (2006.01) |
| F16H 48/08 | (2006.01) |

(52) U.S. Cl.
CPC .............. *B60L 11/123* (2013.01); *B60L 11/14* (2013.01); *B60L 15/20* (2013.01); *F16D 41/088* (2013.01); *F16H 3/10* (2013.01); *F16H 63/30* (2013.01); *B60K 1/00* (2013.01); *B60K 17/165* (2013.01); *B60K 2001/001* (2013.01); *B60L 2220/14* (2013.01); *B60L 2240/421* (2013.01); *B60L 2240/423* (2013.01); *B60L 2260/28* (2013.01); *F16D 2500/10493* (2013.01); *F16H 48/08* (2013.01); *F16H 2063/3093* (2013.01); *F16H 2200/0021* (2013.01); *F16H 2200/0034* (2013.01); *Y02T 10/6217* (2013.01); *Y02T 10/6265* (2013.01); *Y02T 10/7275* (2013.01)

(56) References Cited

U.S. PATENT DOCUMENTS

| | | | |
|---|---|---|---|
| 6,817,457 | B2 * | 11/2004 | Monahan et al. ............... 192/38 |
| 2002/0104397 | A1 | 8/2002 | Bowen |

FOREIGN PATENT DOCUMENTS

| | | | | |
|---|---|---|---|---|
| JP | 6-179326 | | 6/1994 | |
| JP | 2004-211834 | | 7/2004 | |
| JP | 2004-211834 | A * | 7/2004 | |
| JP | 2004-316825 | | 11/2004 | |
| JP | 2004-316825 | A * | 11/2004 | |
| JP | 3683405 | | 6/2005 | |
| JP | 2006-112489 | | 4/2006 | |
| JP | 2006-112489 | A * | 4/2006 | |
| JP | 2008-045601 | * | 2/2008 | ............ F16D 41/06 |
| JP | 2008-45601 | | 2/2008 | |

OTHER PUBLICATIONS

English translation of the Written Opinion of the International Searching Authority issued Oct. 26, 2010 in PCT/JP2010/064442.
International Search Report issued Oct. 26, 2010 in International (PCT) Application No. PCT/JP2010/064442.

* cited by examiner

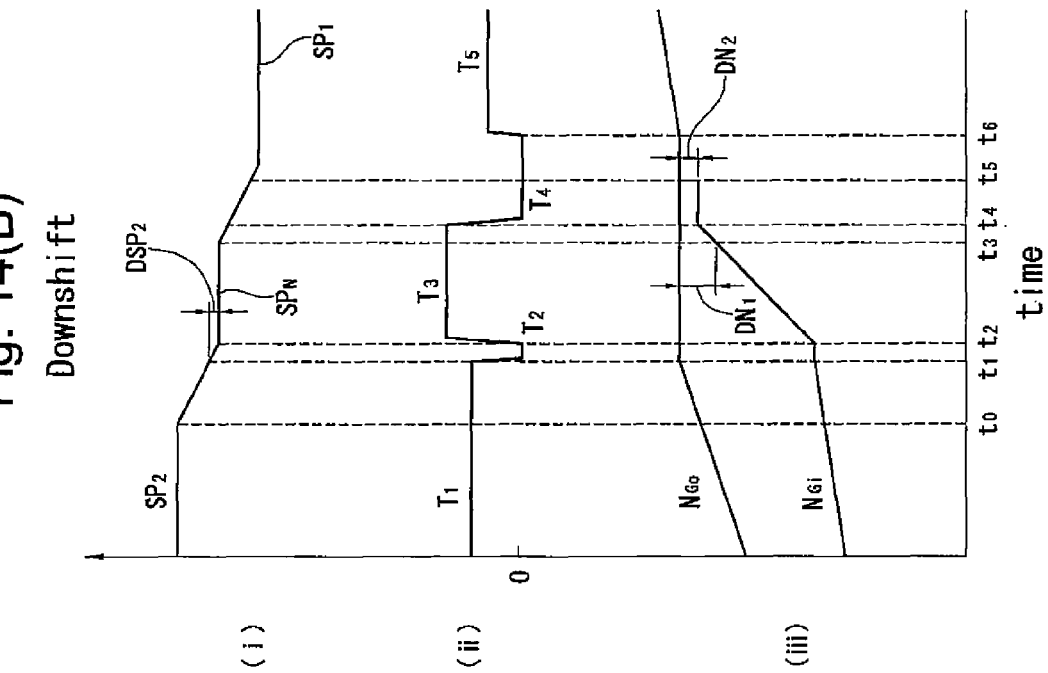
Fig. 14(A) Upshift
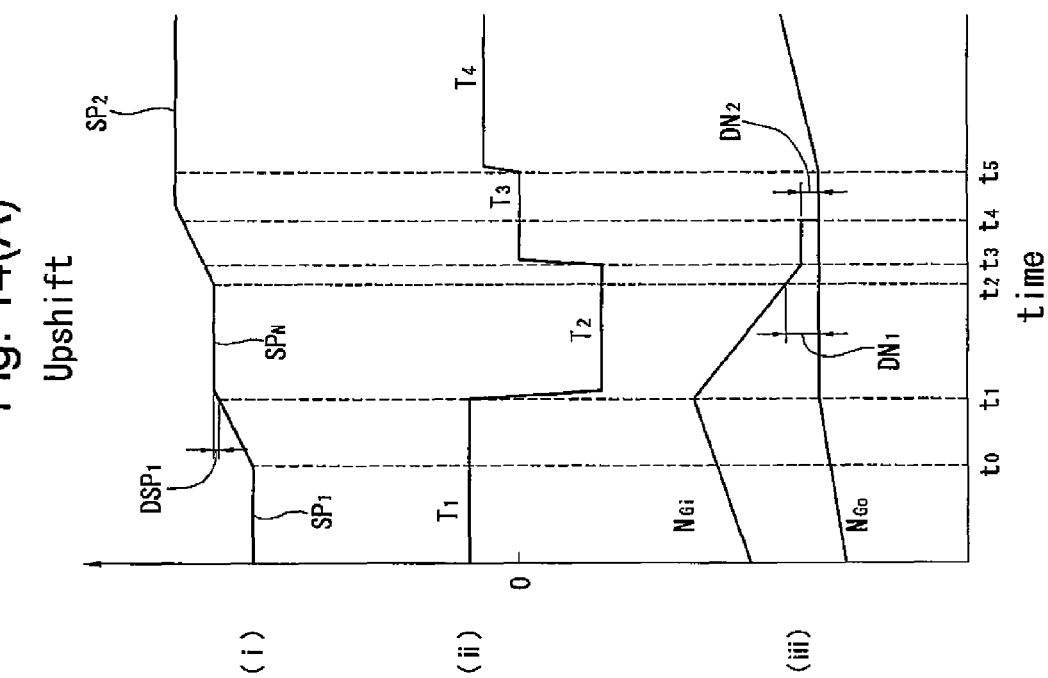
Fig. 14(B) Downshift

MOTOR DRIVE APPARATUS FOR VEHICLE AND MOTOR VEHICLE

TECHNICAL FIELD

This invention relates to a motor drive apparatus for a vehicle including an electric motor as a driving source and adapted to transmit the output of the electric motor to wheels after reducing its speed, and a motor vehicle carrying such a motor drive apparatus.

BACKGROUND ART

Conventional motor drive apparatus used to drive electric vehicles and hybrid vehicles are shown in JP Patent 3683405 and JP Patent Publication 2006-112489A. The motor drive apparatus disclosed in JP Patent 3683405 includes a motor, and a transmission comprising a belt type continuously variable transmission (CVT) or a planetary gear transmission in which the rotational speed of the motor is changed and transmitted to a differential gear assembly, through which the power is distributed to right and left auxiliary (rear) drive wheels.

The motor drive apparatus disclosed in JP Patent Publication 2006-112489A includes a motor, and a transmission comprising a planetary gear transmission in which the rotational speed of the motor is changed and transmitted to a differential gear assembly, through which the power is distributed to right and left auxiliary (rear) drive wheels.

With the motor drive apparatus disclosed in JP Patent 3683405, since the torque transmission path from the motor to the auxiliary drive wheels is always closed, while the vehicle is being driven solely by the engine, the transmission and the motor are rotated by the rotation from the auxiliary drive wheels. This leads to a waste of energy. Especially if the motor is a permanent magnet type synchronous motor, large power is lost to rotate such a motor compared to an induction motor.

With the motor drive apparatus disclosed in JP Patent Publication 2006-112489A, the transmission can be switched over between low-gear, high-gear and neutral positions by sliding a key provided in the transmission. Thus by switching the transmission to the neutral position, it is possible to prevent the transmission and the motor from being rotated by the auxiliary drive wheels. But in order to couple the ring gear of the planetary gear assembly to the casing or to couple the ring gear to the sun gear for gear change, it is necessary to synchronize the two members to be coupled together, i.e. it is necessary to sufficiently reduce the difference in rotational speed between the two members. A long time is necessary for such synchronization of the two members. During such synchronization, the vehicle travels by inertia. This deteriorates drivability of the vehicle and also lowers its commercial value.

SUMMARY OF THE INVENTION

An object of the present invention is to provide a motor drive apparatus for a vehicle which can prevent its transmission and electric motor from being rotated by vehicle wheels, and which allows quick change of gears, and an electric vehicle and a hybrid vehicle using such a motor drive apparatus.

In order to achieve this object, the present invention provides a motor drive apparatus for a vehicle comprising an electric motor, a normally meshing type transmission comprising first and second shafts extending parallel to each other, the first shaft being connected to the electric motor, a plurality of gear trains each provided between the first and second shafts and having different gear ratios from each other, the gear trains each including a two-way roller clutch comprising rollers and a retainer retaining the rollers and configured to be engaged and disengaged by rotating the respective retainers, wherein the first and second shafts are configured to be coupled to each other through any one of the gear trains of which the two-way roller clutch is engaged, and a speed changing actuator assembly for engaging any selected one of the two-way roller clutches by rotating the retainer of the selected one of the two-way roller clutches, thereby coupling the first and second shafts through the gear train including the selected one of the two-way roller clutches, and a differential gear assembly coupled to the second shaft for distributing power transmitted from the electric motor through the transmission to vehicle wheels.

In this motor drive apparatus, when the speed changing actuator assembly is actuated to engage the two-way roller clutch mounted in one of the gear trains having different gear ratios from each other, the two parallel shafts are coupled together through this selected gear train. Thus, the rotation of the electric motor is distributed to the differential gear assembly and the right and left vehicle wheels through the selected gear train. Thus the vehicle wheels can be driven in a desired speed ratio.

When the speed changing actuator assembly is actuated to disengage the above two-way roller clutch, transmission of torque from the electric motor to the differential gear assembly is stopped temporarily. In this state, since the two-way roller clutch is disengaged, the second shaft is rotatable relative to the output gear of the gear train. Thus, torque from the wheels rotates only the second shaft and does not rotate the output gear of the gear train.

The present invention also provides an electric vehicle comprising a vehicle body, right and left front wheels mounted at a front portion of the vehicle body, right and left rear wheels mounted at a rear portion of the vehicle body, and the above-motor drive apparatus, the motor drive apparatus being configured to drive the front wheels and/or the rear wheels.

The present invention further provides a hybrid vehicle comprising a vehicle body, right and left front wheels mounted at a front portion of the vehicle body, right and left rear wheels mounted at a rear portion of the vehicle body, an engine that drives the front wheels or the rear wheels, and the above-described motor drive apparatus, the motor drive apparatus being configured to drive the front wheels or the rear wheels that are not driven by the engine.

When this motor drive apparatus is used in a hybrid vehicle, by keeping the two-way clutches disengaged while the vehicle is being driven by the engine, it is possible to prevent the transmission and the motor from being rotated by the wheels being driven by the engine, thereby minimizing energy loss.

The two-way roller clutches may each comprise an inner ring mounted between one of the first and second shafts and a gear of the corresponding gear train and rotationally fixed to the one of the first and second shafts, wherein a cylindrical surface is formed on one of a radially outer periphery of the inner ring and a radially inner periphery of the gear of the gear train, and cam surfaces are formed on the other of the radially outer periphery of the inner ring and the radially inner periphery of the gear of the gear train, thereby defining wedge-shaped spaces between the cylindrical surface and the respective cam surfaces, each wedge-shaped space narrowing toward its circumferential ends, wherein said rollers are disposed between the cylindrical surface and the respective cam surfaces, and wherein said retainer is mounted between the inner ring and the gear of the gear train, wherein the two-way roller clutch further comprises a switch spring mounted between the retainer and one of the inner ring and the gear of the gear train that is formed with the cam surfaces for elastically retaining the retainer in a neutral position where the rollers are in engagement with neither the cylindrical surface nor the cam surfaces.

The speed changing actuator assembly may comprise friction plates each rotationally fixed to the retainer of one of the two-way roller clutches and movable toward one side of one of the members that are formed with said cylindrical surfaces, elastic members each biasing one of the friction plates away from said one of the members formed with said cylindrical surfaces, a control ring slidably supported on said one of the first and second shafts and movable toward any one of the members formed with said cylindrical surfaces, thereby pressing the corresponding friction plate against the one side of the one of the members formed with said cylindrical surfaces, a sleeve rotatably supported around the control ring, and a shift mechanism for shifting the sleeve toward any one of the members formed with said cylindrical surfaces.

When using this type of speed changing actuator assembly, the motor drive apparatus preferably further comprises an electronic control unit for controlling the electric motor and the speed changing actuator assembly, said electronic control unit being configured, upon receiving a command to change gears, to actuate the speed changing actuator assembly to move one of the friction plates away from the corresponding one of the members formed with said cylindrical surfaces, simultaneously determine whether the one of the friction plates has actually moved away from the one of the members formed with said cylindrical surfaces, and if the electronic control unit determines that the one of the friction plate has actually moved away from the one of the members formed with said cylindrical surfaces, the electronic control unit is configured to change a torque of the electric motor to a level which allows disengagement of the two-way roller clutch corresponding to said one of the friction plates, and after the two-way roller clutch corresponding to said one of the friction plates has been disengaged, the electronic control unit controls the speed changing actuator assembly to engage another one of the two-way roller clutches. With this arrangement, it is possible to maintain torque of the motor until the electronic control unit determines that the friction plate has moved away from the member formed with the cylindrical surface, thereby minimizing the time during which torque is not being produced from the motor.

That is, it is possible to shorten the time during which torque is not produced from the motor during gear change, compared to the arrangement in which the torque of the motor disappears as soon as the speed changing actuator assembly is activated.

The shift mechanism of the speed changing actuator assembly may comprise a shift rod extending parallel to the first and second shafts and movable in an axial direction of the shift rod, an actuator for moving the shift rod in the axial direction, and a shift fork supported by the shift rod and configured to move the control ring toward one of the members formed with said cylindrical surfaces together with the sleeve.

In this arrangement, when the shift rod is moved in one axial direction by the actuator, the sleeve and the control ring is moved by the shift fork toward one of the members formed with the cylindrical surfaces until the corresponding friction plate is pressed against and brought into frictional engagement with the one of the members formed with the cylindrical surfaces, thereby coupling the retainer to the member formed with the cylindrical surface. Thus, in this state, the retainer rotates relative to the member formed with the cam surfaces, thereby instantly engaging the two-way clutch. The rotation of the electric motor is thus reduced and transmitted to the differential gear assembly, which in turn rotates the wheels.

In this arrangement, the transmission may further comprise a rotary member rotationally fixed to the members formed with said cam surfaces, and engaging means for rotationally fixing the respective friction plates to the rotary member when the friction plates are out of frictional engagement with the respective members formed with said cylindrical surfaces. This prevents the rollers from engaging in error due to drag torque resulting from inertia and frictional force applied to the retainer and the rollers of the two-way roller clutch while the vehicle is accelerating or decelerating.

In a specific arrangement wherein the control ring is disposed between two adjacent ones of the gear trains, wherein two of the two-way roller clutches are mounted in said two adjacent ones of the gear trains, and wherein two of the friction plates are provided on respective sides of the control ring, and are rotationally fixed to the respective retainers of said two of the two-way roller clutches, whereby said two of the two-way rollers clutches can be selectively engaged and disengaged by the speed changing actuator assembly, it is possible to minimize the size of the entire motor drive apparatus.

The speed changing actuator assembly may further comprise a rolling bearing mounted between the control ring and the sleeve. With this arrangement, since the rotation of the control ring is not transmitted to the sleeve, gears can be changed smoothly.

The speed changing actuator assembly may further comprise rolling bearings mounted between the respective friction plates and the control ring. With this arrangement, it is possible to reduce frictional resistance produced between the respective friction plates and the control ring, which in turn allows smooth rotation between one of the friction plates and the control ring when the one of the friction plates is in frictional engagement with the side of the member formed with the cylindrical surface. This ensures reliable engagement of the two-way roller clutch.

The actuator of the speed changing actuator assembly, which axially moves the shift rod, may be a motor, or a cylinder or a solenoid connected to the shift rod.

If a motor is used as the actuator, the shift mechanism may further comprise a motion converter for converting the rotation of the motor to axial movement of the shift rod. Such a motion converter may comprise a nut member rotatably supported around the shift rod and rotated by the motor, the nut member being formed with an internal thread on its inner periphery which is in threaded engagement with an external thread formed on an outer periphery of the shift rod.

The motor drive apparatus according to the present invention includes an electric motor, a normally meshing type transmission comprising first and second shafts extending parallel to each other, and a plurality of gear trains each provided between the first and second shafts and having different gear ratios from each other. The gear trains each include a two-way roller clutch disposed between a gear of the gear train and one of the first and second shafts. The two-way roller clutches are selectively engaged and disengaged by the speed changing actuator assembly. By disengaging the two-way roller clutches, it is possible to prevent the transmission and the motor from being rotated by vehicle wheels. When this motor drive apparatus is used in a hybrid vehicle to drive auxiliary vehicle wheels, it is possible to minimize energy loss while the vehicle is being driven by the engine.

By controlling the rotation of the retainers of the respective two-way roller clutches by actuating the speed changing actuator assembly, the two-way roller clutches can be instantly engaged and disengaged, so that gear change can be made quickly.

BRIEF DESCRIPTION OF THE DRAWINGS

FIG. 14(A) shows the relationship between the shift position during upshift control, torque of the electric motor, and the rotational speeds of the input and output members of a higher speed two-way roller clutch; and FIG. 14(B) shows the relationship between the shift position during downshift control, torque of the electric motor, and the rotational speeds of the input and output members of a lower speed two-way roller clutch.

DETAILED DESCRIPTION OF THE INVENTION

Figure 1A:
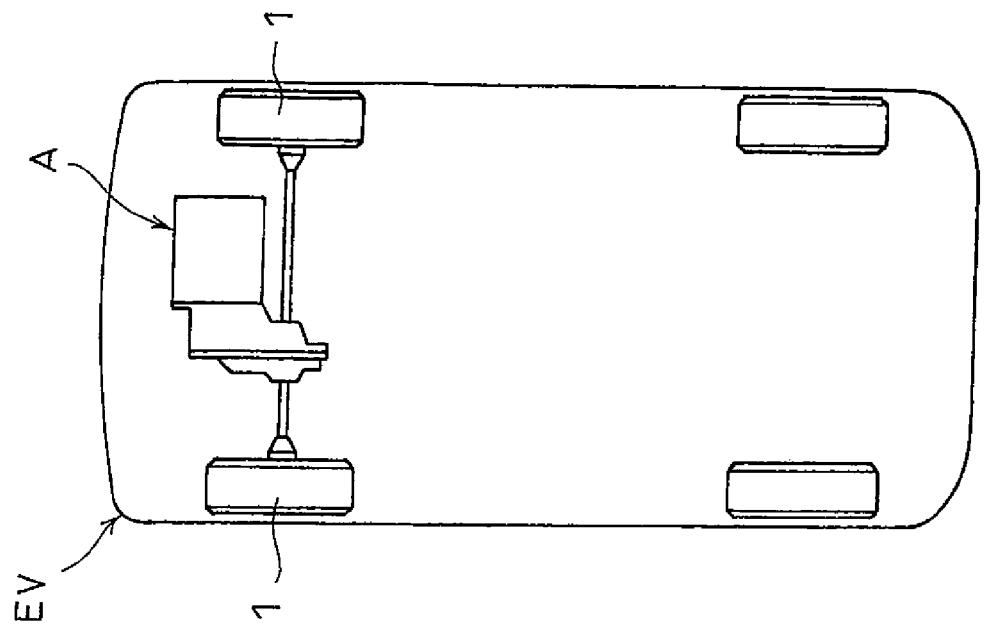
FIG. 1(A) is a schematic view of an electric vehicle in which a motor drive apparatus according to the present invention is used.
Figure 1B:
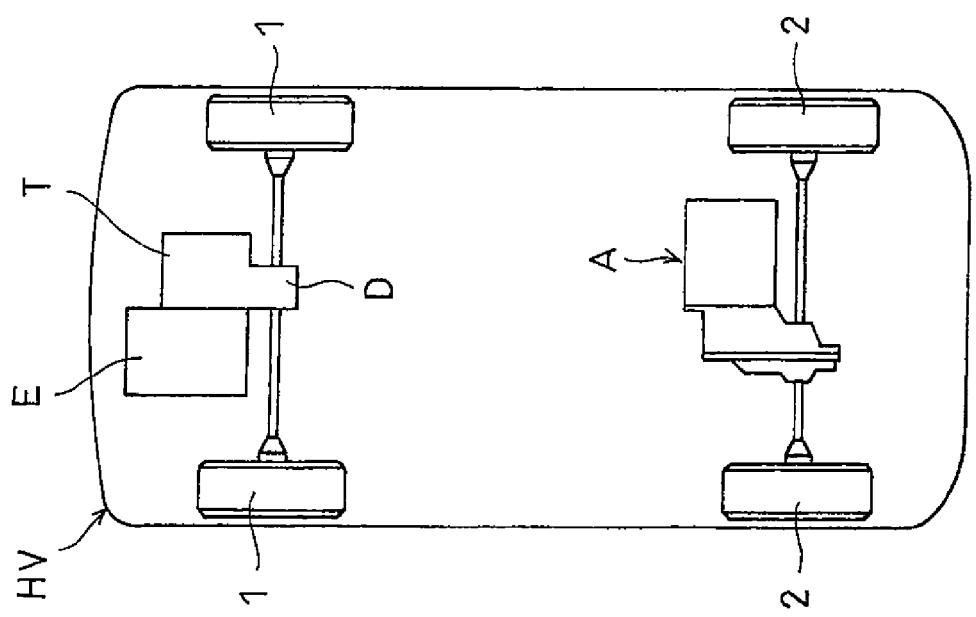
FIG. 1(B) is a schematic view of a hybrid vehicle in which the motor drive apparatus according to the present invention is used.

The embodiment of the present invention is now described with reference to the drawings. FIG. 1(A) shows an electric vehicle EV including a motor drive apparatus A according to the present invention, which is configured to drive the right and left front wheels 1 of the vehicle. FIG. 1(B) shows a hybrid vehicle HV including an engine E configured to drive the right and left front wheels of the vehicle, and the motor drive apparatus A according to the present invention configured to drive the right and left rear wheels 2 of the vehicle. The revolution of the engine E is transmitted to the front wheels 1 through a transmission T and a differential gear assembly D.

Figure 2:
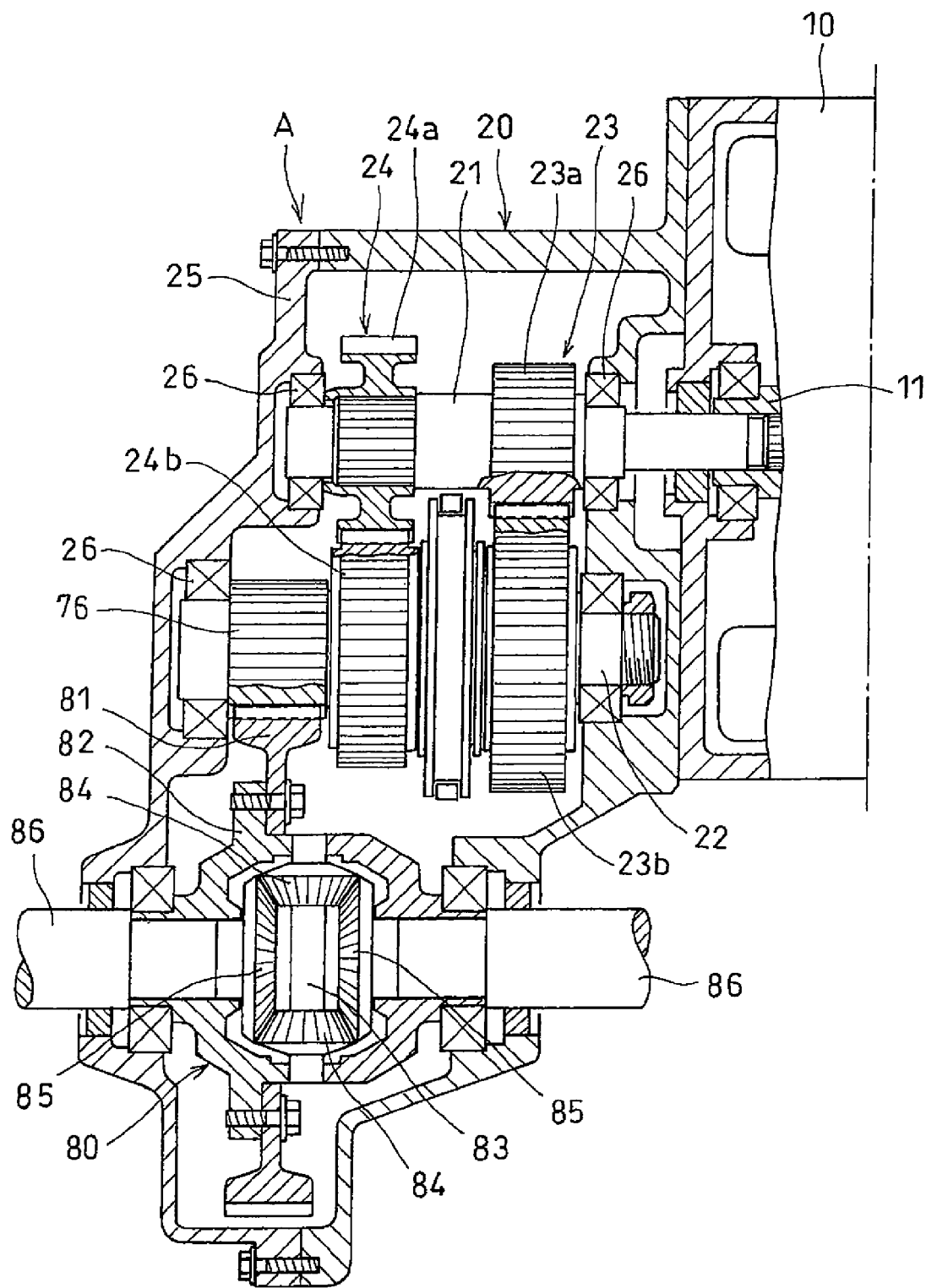
FIG. 2 is a sectional view of the motor drive apparatus according to the present invention.

As shown in FIG. 2, the motor drive apparatus A comprises an electric motor 10 having an output shaft 11, a transmission 20 for changing the rotational speed of output shaft 11 of the electric motor 10, and a differential gear assembly 80 for distributing the power from the transmission 20 to the right and left front wheels 1 of the electric vehicle EV shown in FIG. 1(A), or to the right and left rear wheels 2 of the hybrid vehicle HV shown in FIG. 1(B).

The transmission 20 is a normally meshing transmission comprising first and second shafts 21 and 22, and first reduction gear train 23 and a second reduction gear train 24 that are disposed between the first and second shafts 21 and 22.

The first and second shafts 21 and 22 are each rotatably supported by a pair of opposed bearings 26 mounted in a housing 25 so as to extend parallel to each other. The first shaft 21 is connected to the output shaft 11 of the electric motor 10.

The first reduction gear train 23 comprises a first input gear 23a mounted on the first shaft 21, and a first output gear 23b meshing with the first input gear 23a and mounted on the second shaft 22 so as to be rotatable around the second shaft 22.

The second reduction gear train 24 comprises a second input gear 24a mounted on the first shaft 21, and a second output gear 24b meshing with the second input gear 24a and mounted on the second shaft 22 so as to be rotatable around the second shaft 22. The second reduction gear train 24 creates a lower reduction ratio than the first reduction gear train 23.

Figure 3:
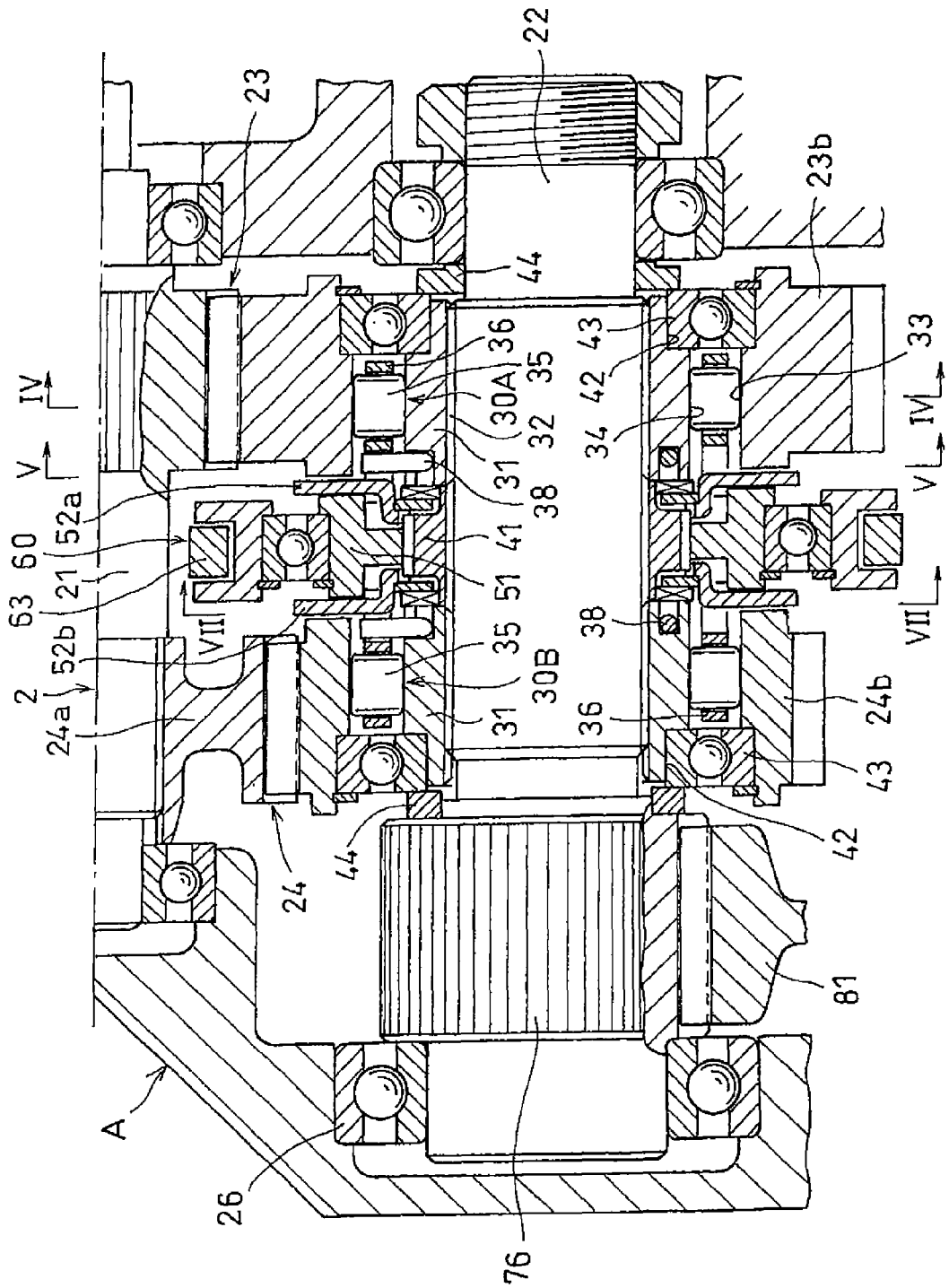
FIG. 3 is a partial enlarged sectional view of a transmission of the motor drive apparatus of FIG. 2.
Figure 4:
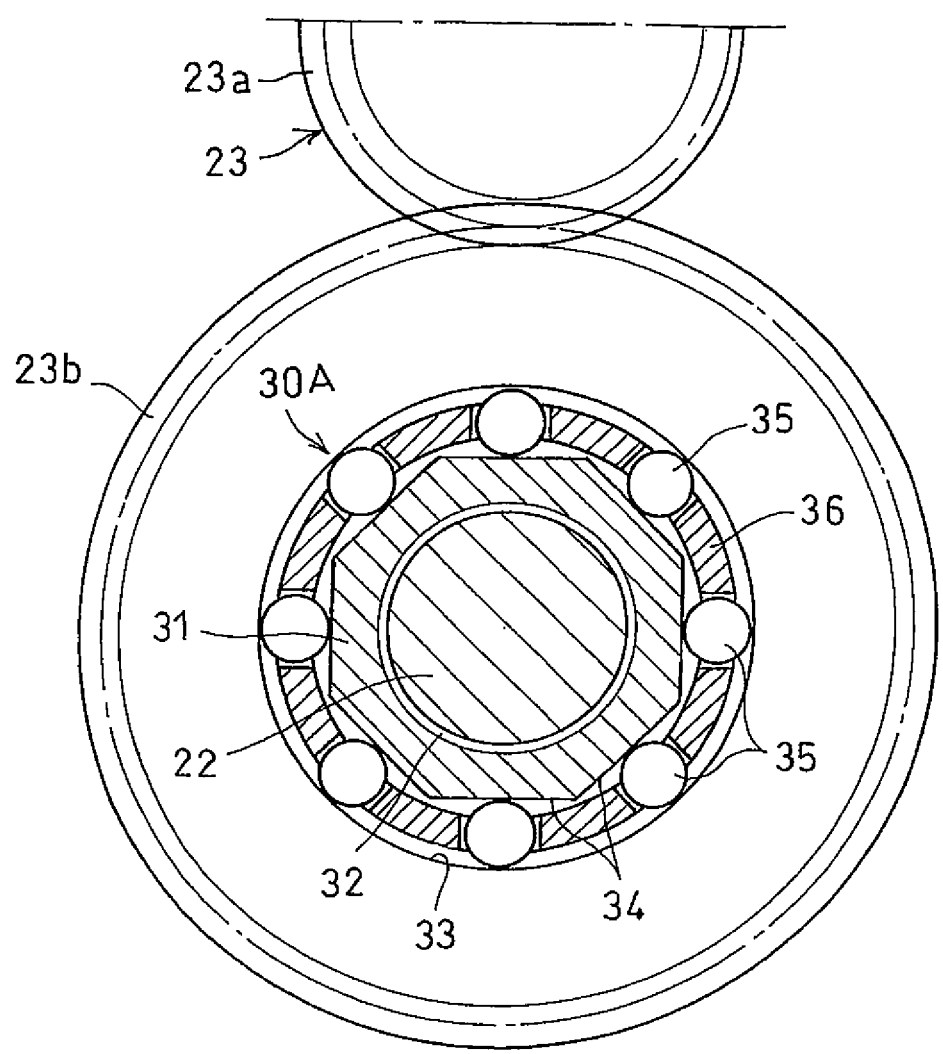
FIG. 4 is a sectional view taken along line IV-IV of FIG. 3.
Figure 5:
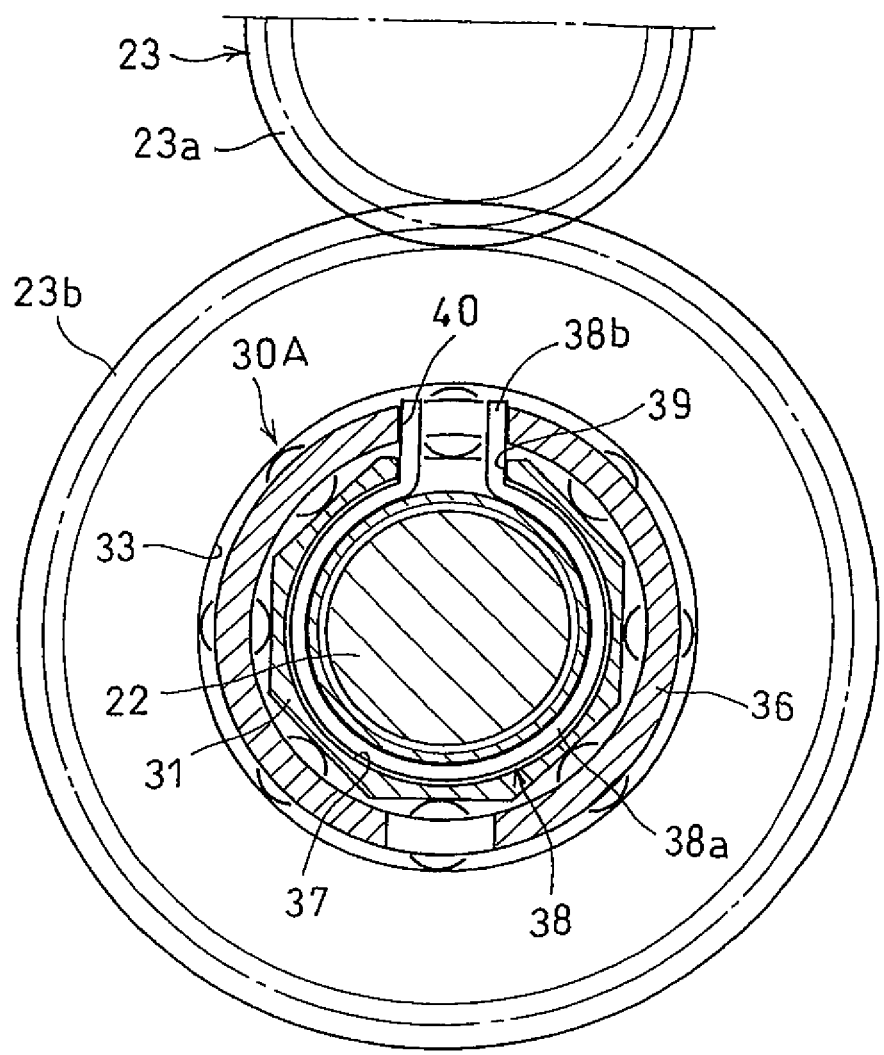
FIG. 5 is a sectional view taken along line V-V of FIG. 3.

As shown in FIGS. 3 to 5, a first two-way roller clutch 30A is mounted between the first output gear 23b and the second shaft 22 for selectively rotationally coupling and uncoupling the first output gear 23b to and from the second shaft 22. Similarly, a second two-way roller clutch 30B is mounted between the second output gear 24b and the second shaft 22 for selectively rotationally coupling and uncoupling the second output gear 24b to and from the second shaft 22.

The first and second two-way rollers clutches 30A and 30B are structurally identical to each other and mounted on the second shaft in opposite directions to each other. Thus, only the first two-way roller clutch 30A is described below, and the description of the second two-way roller clutch 30B is omitted with like elements of the latter denoted by identical numerals.

The first two-way roller clutch 30A includes an inner ring 31 rotationally fixed to the second shaft 22 by means of splines 32 and having circumferentially equidistantly spaced apart flat cam surfaces 34 on its radially outer surface that each defines a wedge-shaped space which narrows toward its circumferential ends, in cooperation with a cylindrical surface 33 formed on the radially inner periphery of the first output gear 23b. The roller clutch 30A further includes rollers 35 mounted between the respective cam surfaces 34 and the cylindrical surface 33, and a retainer 36 mounted between the first output gear 23b and the inner ring 31 and retaining the rollers 35.

The inner ring 31 is formed with a recess 37 in one of its axial end surfaces in which a circular portion 38a of a switch spring 38 is received. The switch spring 38 has a pair of pressing pieces 38b radially outwardly extending from respective circumferential ends of the circular portion 38a. The pressing pieces 38b extend through a cutout 39 formed in the peripheral wall of the recess 37 and are inserted into one of two cutouts 40 formed in the end surface of the retainer 36, thereby pressing the circumferentially opposed end surfaces of the respective cutouts 39 and 40 circumferentially away from each other, and elastically keeping the retainer 36 in a neutral position where the rollers 35 are in engagement with neither the cylindrical surface 33 nor the cam surfaces 34.

The inner rings 31 of the respective first and second two-way roller clutches 30A and 30B are axially immovably sandwiched between a spacer 41 provided in a space between the axially opposed ends of the inner rings 31 and respective stopper rings 44 fitted on the second shaft 22. The spacer 41 is a rotary member rotationally fixed to the inner rings 31.

Each inner ring 31 has, at its axially outer end facing the stopper ring 44, a cylindrical bearing fitting surface 42 on which a bearing 43 is fitted which rotatably supports the first output gear 23b or the second output gear 24b relative to the inner ring 31.

Figure 6:
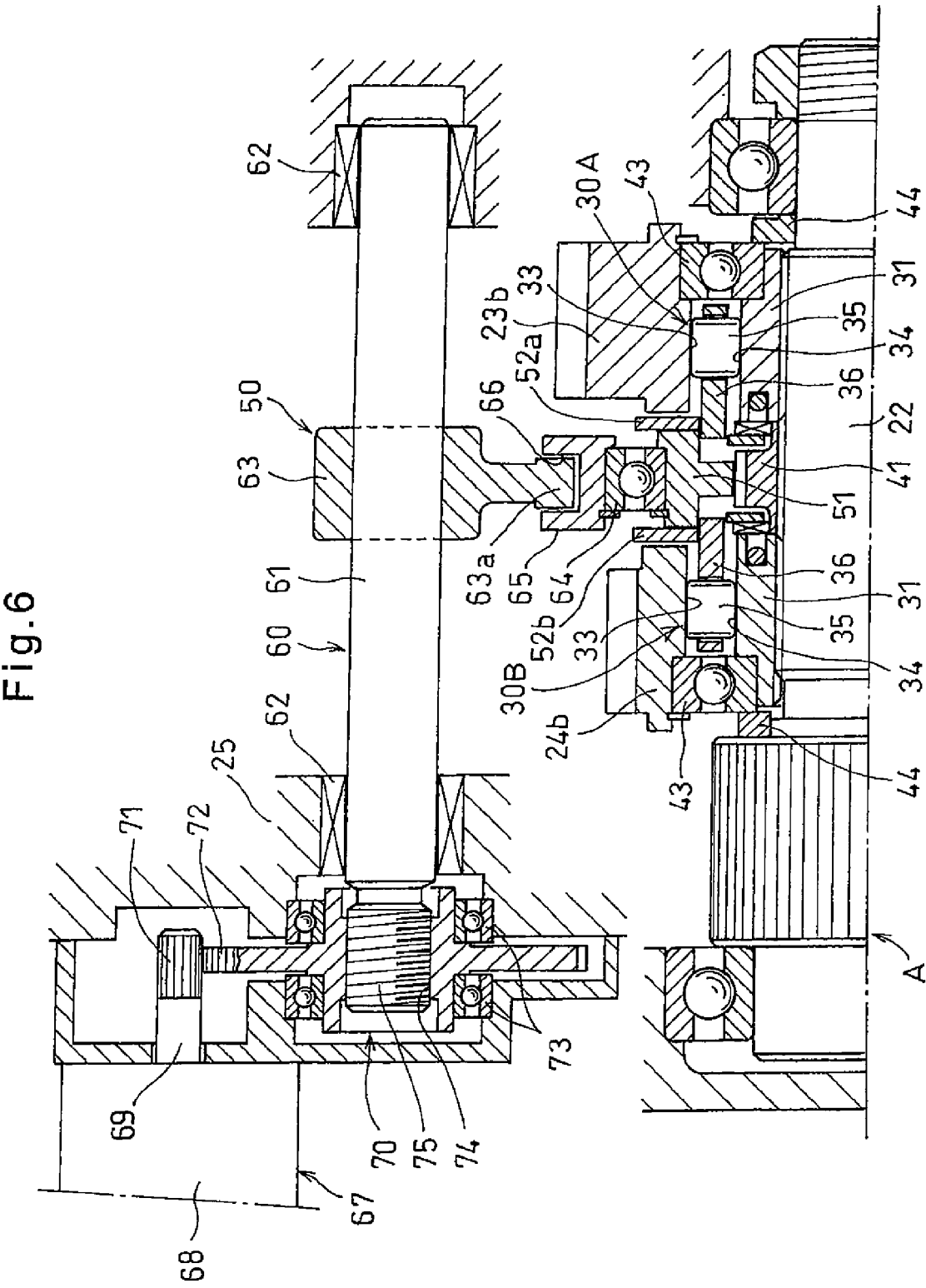
FIG. 6 is a sectional view of a speed changing actuator assembly.
Figure 7:
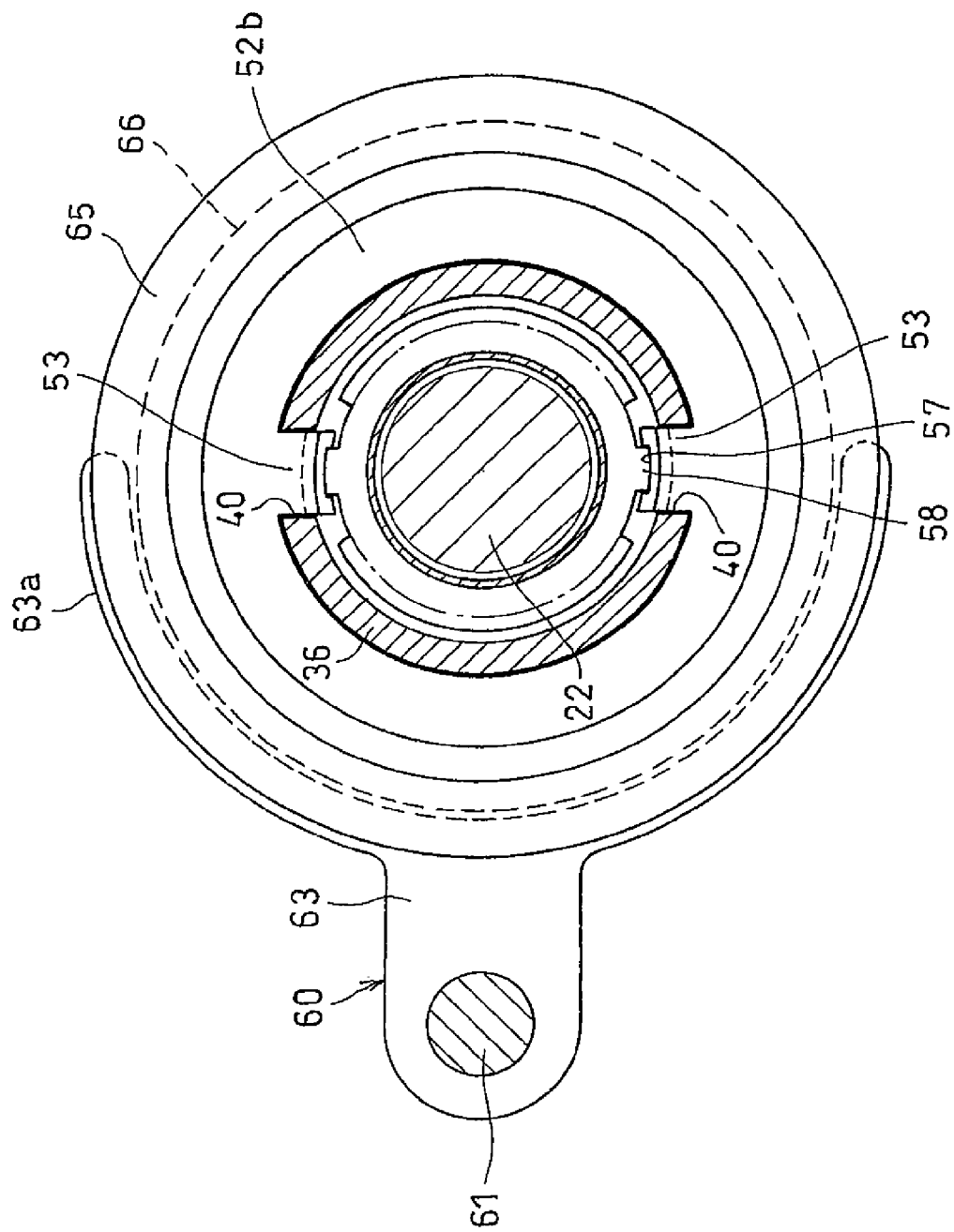
FIG. 7 is a sectional view taken along line VII-VII of FIG. 3.
Figure 8:
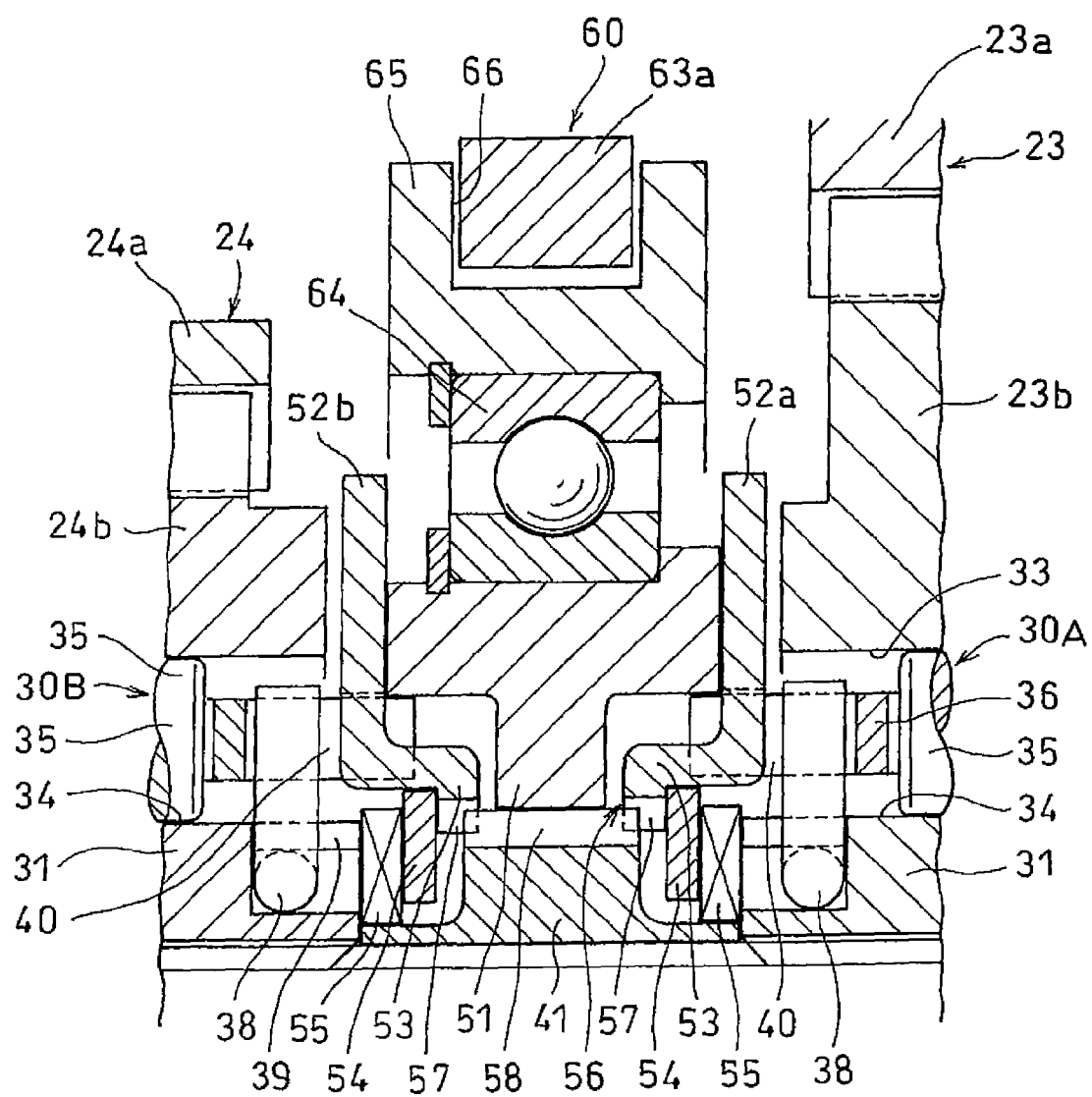
FIG. 8 is an enlarged sectional view of a portion of FIG. 6.
Figure 9:
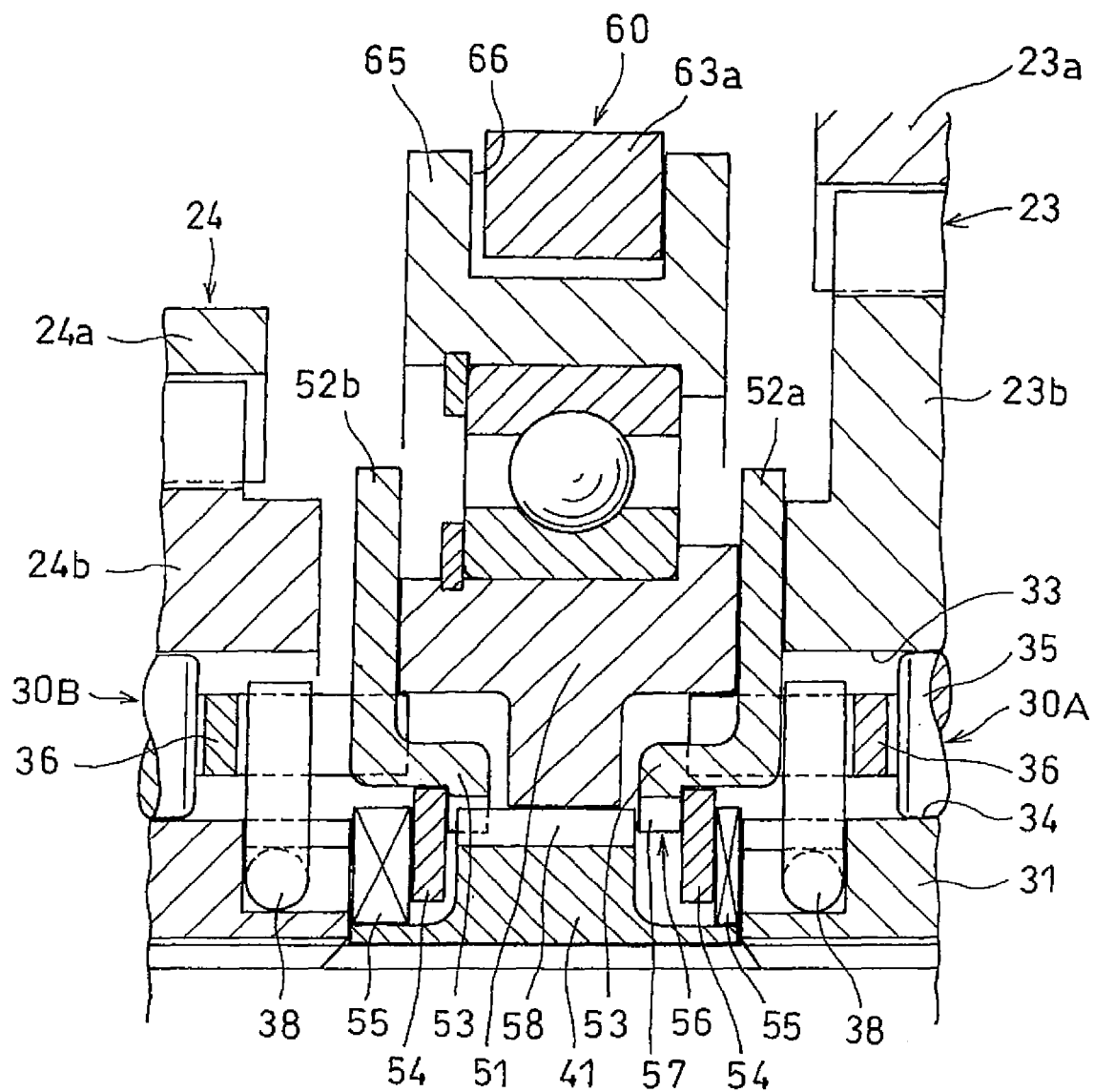
FIG. 9 is a sectional view similar to FIG. 8, showing how gears are changed.
Figure 10:
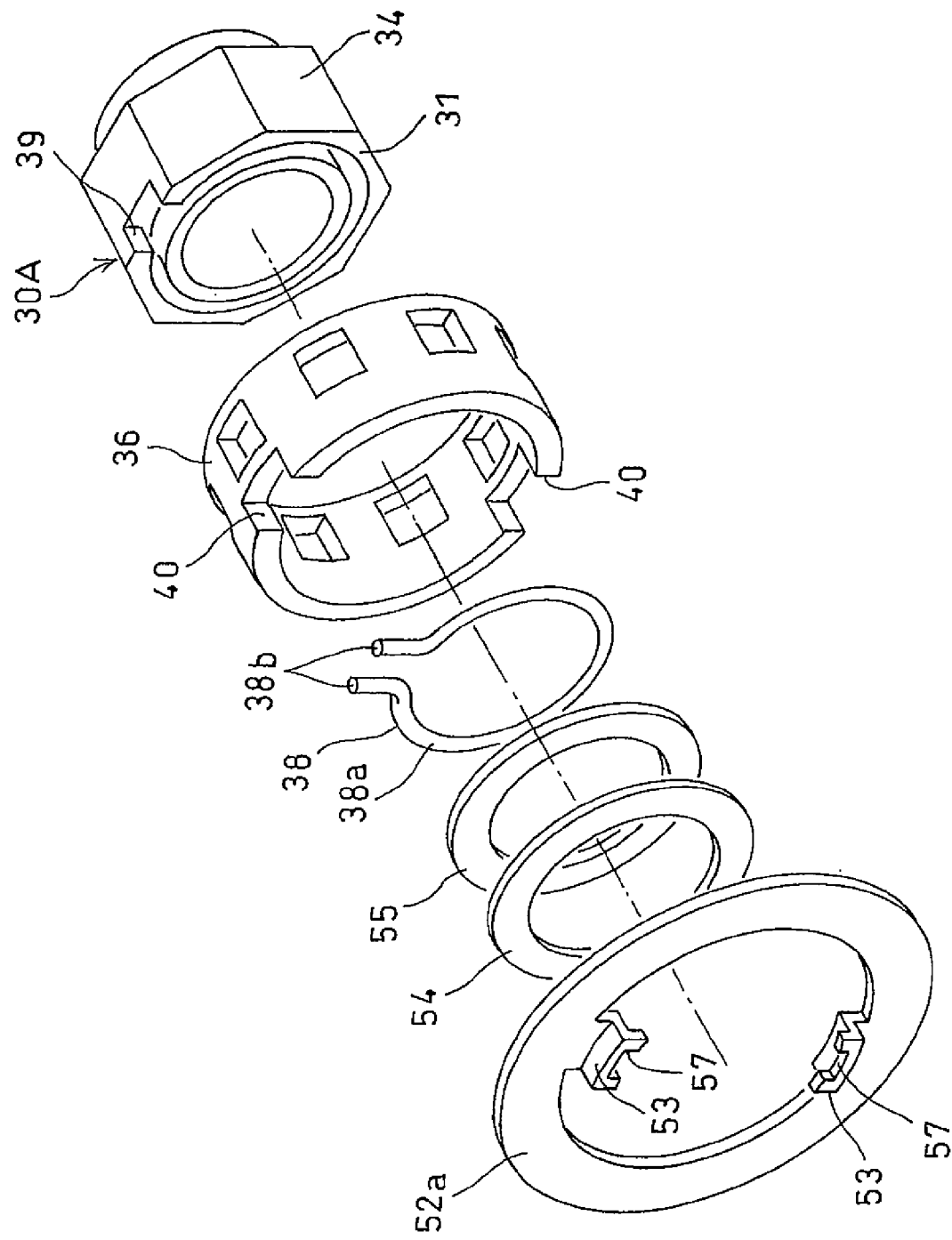
FIG. 10 is an exploded perspective view of a two-way clutch, which includes an inner ring, a retainer, a washer, and a switch spring, and a speed changing actuator assembly, which includes an elastic member and a friction plate.

The first and second two-way roller clutches 30A and 30B are selectively engaged and disengaged by a speed-changing actuator assembly 50 shown in FIGS. 6-8.

The speed changing actuator assembly 50 comprises a control ring 51 provided around the spacer 41 so as to be rotatable and axially movable, first and second friction plates 52a and 52b provided on both sides of the control ring 51 and rotationally fixed to the retainers 36 of the first and second two-way roller clutches 30A and 30B, respectively, and a shift mechanism 60 for axially moving the control ring 51. When the control ring 51 is moved by the shift mechanism 60 toward the first output gear 23b, the first friction plate 52a is pressed against and brought into frictional engagement with the side of the first output gear 23b, thus coupling the retainer 36 of the first two-way roller clutch 30A to the first output gear 23b. Thus in this state, the retainer 36 of the first two-way roller clutch 30A rotates relative to inner ring 31, causing the rollers 35 to engage the cylindrical surface 33 and the cam surfaces 34.

When the control ring 51 is moved by the shift mechanism 60 toward the second output gear 24b, the second friction plate 52b is pressed against and brought into frictional engagement with the side of the second output gear 24b, thus coupling the retainer 36 of the second two-way roller clutch 30B to the second output gear 24b. Thus in this state, the retainer 36 of the second two-way roller clutch 30B rotates relative to the inner ring 31, causing the rollers 35 to engage the cylindrical surface 33 and the cam surfaces 34.

The first and second friction plates 52a and 52b are annular members each having L-shaped engaging pieces 53 engaged in the respective cutouts 40 of the corresponding retainer 36, thereby rotationally fixing the friction plates 52a and 52b to the respective retainers 36. A washer 54 and an elastic member 55 are mounted between the engaging pieces of each of the first and second friction plates 52a and 52b and the inner ring 31 such that the elastic member 55 biases the friction plate 52a, 52b toward being spaced apart and disengaged from the inner ring 31.

The engaging pieces 53 are formed with engaging grooves 57 in their radially inner end surfaces. The spacer 41 is formed with engaging ribs 58 on its radially outer surface which constitutes an engaging means 58 in cooperation with the engaging grooves 57. The engaging means 58 is configured such that when either of the first and second friction plates 52a or 52b is not in engagement with the corresponding output gear, one of the engaging ribs 58 is engaged in one of the engaging grooves 57 of the friction plate 52a or 52b that is not in engagement with the output gear, thereby keeping the rollers 35 of the corresponding two-way clutch in the neutral positions by preventing relative rotation between the inner ring 31, which is rotationally fixed to the spacer 41, and the retainer 36.

As shown in FIG. 6, the shift mechanism 60 includes a shift rod 61 extending parallel to the second shaft 22 and slidably supported by a pair of slide bearings 62 mounted on the housing 25. The shift rod 61 carries a shift fork 63 having a bifurcated piece 63a at its free end. A sleeve 65 is supported around the control ring 51 through a rolling bearing 64 so as to be rotatable but axially immovable relative to the control ring 51. The sleeve 65 has an annular groove 66 in its radially outer surface in which the bifurcated piece 63a of the shift fork 63 is engaged. Thus, by axially moving the shift rod 61 with an actuator 67, the control ring 51 can be moved axially together with the sleeve 65.

The actuator 67 may be a cylinder or a solenoid connected to the shift rod 61. The actuator 67 shown is a motor 68 having an output shaft 69. The rotation of the output shaft 69 is converted to the axial movement of the shift rod 61 through a motion converter 70.

The motion converter 70 includes an idler gear 72 as a nut member which meshes with a drive gear 71 mounted on the output shaft 69 of the motor 68 and rotatably supported by an axially opposed pair of bearings 73. The idler gear 72 has an internal thread 74 on its radially inner surface which meshes with an external thread 75 formed on the outer periphery of the shift rod 61 at its end portion. Thus, when the idler gear 72 is rotated by the motor 68, the shift rod 61 is moved axially with the idler gear 72 not moved axially.

As shown in FIG. 2, the second shaft 22 carries a third output gear 76 through which the rotation of the second shaft 22 is transmitted to the differential gear assembly 80.

The differential gear assembly 80 comprises a differential case 82 rotatably supported by the housing 25, a ring gear 81 mounted to the differential case 82 and meshing with the third output gear 76, a pinion shaft 83 having its ends rotatably supported by the differential case 82, a pair of pinions 84 mounted on the pinion shaft 83, and a pair of side gears 85 each meshing with both pinions 84. Wheel axles 86 have their ends connected to the respective side gears 85.

Figure 11:
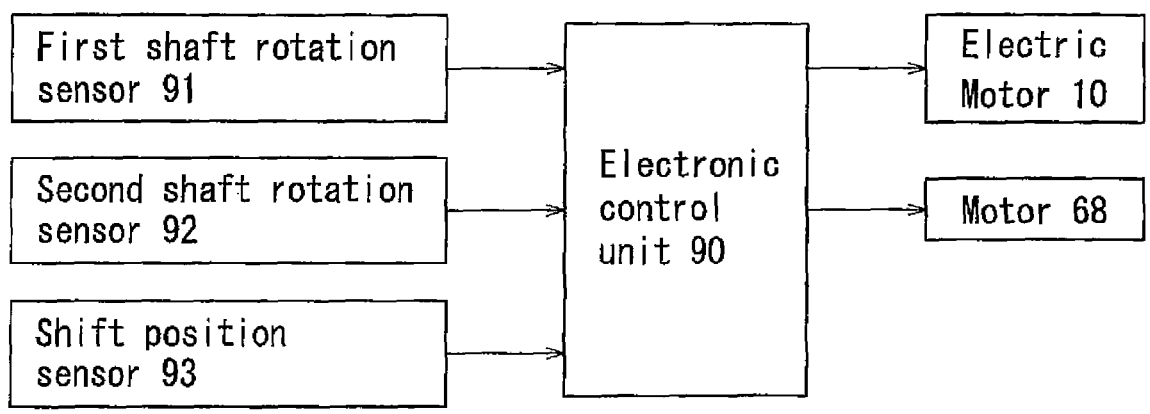
FIG. 11 is a block diagram of an electronic control unit for controlling the motor drive apparatus shown in FIG. 2.

The rotation of the electric motor 10 is controlled by a control signal from an electronic control unit 90 shown in FIG. 11. Detection signals are entered into the electronic control unit 90 from a first shaft rotation sensor 91 which indicates the rotational speed of the first shaft 21, a second shaft rotation sensor 92 which indicates the rotational speed of the second shaft 22, and a shift fork position sensor 93 which indicates the position of the shift fork 63. The shift fork position sensor 93 may be a potentiometer connected to the shift rod 61. The electronic control unit 90 also produces a control signal for controlling the rotation of the motor 68.

FIG. 3 shows an operational state of the vehicle motor drive apparatus A of the embodiment where the first and second friction plates 52a and 52b are both disengaged from the first and second output gears 23b and 24b, respectively, and thus the first and second two-way clutches 30A and 30B, which are mounted inside the first and second output gears 23b and 24b, respectively, are both disengaged, as shown in FIG. 4.

Thus when the first shaft 21 is rotated by the electric motor 10 in this state, only the first output gear 23b and the second output gear 24b are rotated through the first and second input gears 23a and 24a, respectively, and the rotation of the first shaft 21 is not transmitted to the second shaft 22.

In this state, since the rollers 35 of the first and second two-way roller clutches 30A and 30B, which are in neutral positions, are in contact with the cylindrical surfaces 33, drag torque acts on the rollers 35 and this drag torque tends to rotate the retainers 36.

But in this state, since the friction plates 52a and 52b, which are rotationally fixed to the respective retainers 36, are also rotationally fixed to the respective inner rings 31 by the engagement of the engaging grooves and the engaging ribs 58, the retainers 36 are rotationally fixed to the respective inner rings 31 through the respective friction plates. Thus, drag torque that acts on the rollers 35 in this state would never rotate the retainers 36 relative to the respective inner rings 31, which prevents untimely engagement of the first or second two-way clutches 30A, 30B.

In this state, when the shift rod 61 is moved rightwardly in FIG. 6 by the motor 68, the sleeve 65 and the control ring 51 are moved rightwardly by the shift fork 63. The control ring 51 thus presses the first friction plate 52a against the side of the first output gear 23b and thus brings the friction plate 52a into frictional engagement with the first output gear 23b.

Simultaneously, the engaging ribs 58 of the spacer 41 disengage from the engaging grooves 57 of the first friction plate 52a. The retainer 36 is frictionally coupled to the first output gear 23A.

Thus, the retainer 36 of the first two-way roller clutch 30A rotates relative to the inner ring 31, causing the rollers 35 to engage the cylindrical surface 33 and the cam surfaces 34, and thus coupling the retainer 36 to the first output gear 23b. The rotation of the first output gear 23b is transmitted to the second shaft 22 through the first two-way roller clutch 30A. The rotation of the second shaft 22 is in turn transmitted to the wheel axles 86 through the differential gear assembly 80.

In particular, in the electric vehicle EV shown in FIG. 1(A), the axles 86 are connected to the front wheels 1, so that the front wheels 1 are driven by the electric motor 10. In the hybrid vehicle HV shown in FIG. 1(B), the axles 86 are connected to the rear wheels 2 as auxiliary drive wheels. Thus, the electric motor 10 drives the rear wheels 2, assisting in the drive of the front wheels 1.

When the retainer 36 of the first two-way roller clutch 30A rotates relative to the inner ring 31 in the above manner, the switch spring is elastically deformed. When the motor 68 is driven in the opposite direction to move the shift rod 61 in the opposite direction (leftwardly in FIG. 6), thereby moving the control ring 51 away from the first output gear 23b, the first friction plate 52a separates from the first output gear 23b under the biasing force of the elastic member 55. Simultaneously, the retainer 36 is moved back to its original position under the biasing force of the switch spring 38, so that the rollers 35 return to their neutral positions, preventing transmission of rotation from the first shaft 21 to the second shaft 22.

When the shift rod 61 is further moved in this direction (leftwardly in FIG. 6), the second friction plate 52b is pressed against and brought into frictional engagement with the side of the second output gear 24b by the control ring 51.

This causes the retainer 36 of the second two-way clutch 30B to rotate relative to the inner ring 31 until the rollers 35 engage the cylindrical surface 33 and the cam surfaces 34, thus allowing the rotation of the first shaft 21 to be now transmitted through the second output gear 24b and the second two-way roller clutch 30B to the second shaft 22.

But actually, while torque is being transmitted between the input and output members of e.g. the two-way roller clutch 30A, i.e. between the first output gear 23b and the inner ring 31, it is difficult or utterly impossible to disengage the two-way roller clutch 30A simply by separating the friction plate 52a from the first output gear 23b.

In particular, in order to reliably disengage the two-way roller clutch 30A, it is necessary not only to separate the friction plate 52a from the first output gear 23b but to lower the torque being transmitted between the first output gear 23b and the inner ring 31 to zero.

Figure 12:
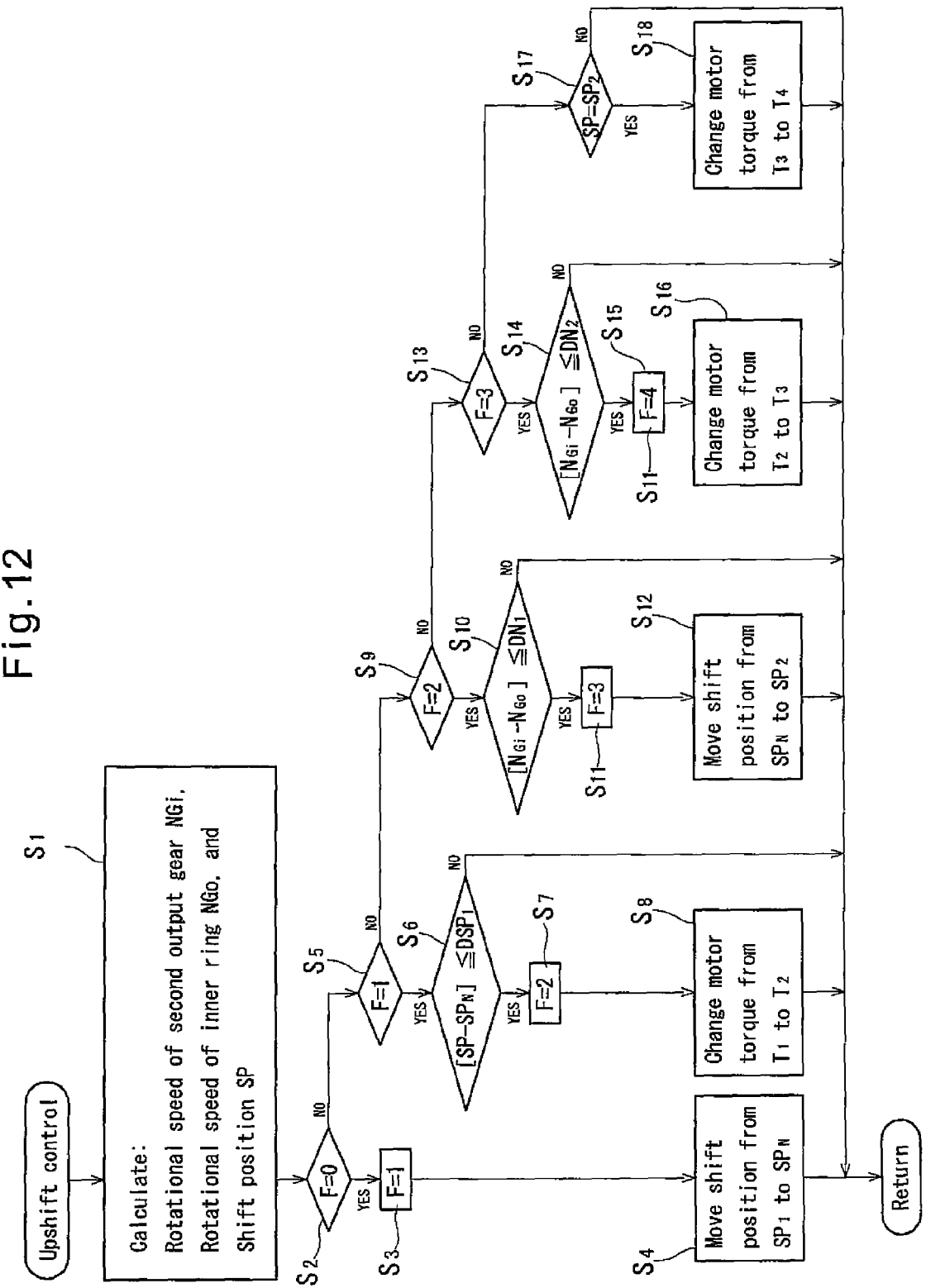
FIG. 12 is a flowchart showing the flow of upshift control by the electronic control unit shown in FIG. 11.
Figure 13:
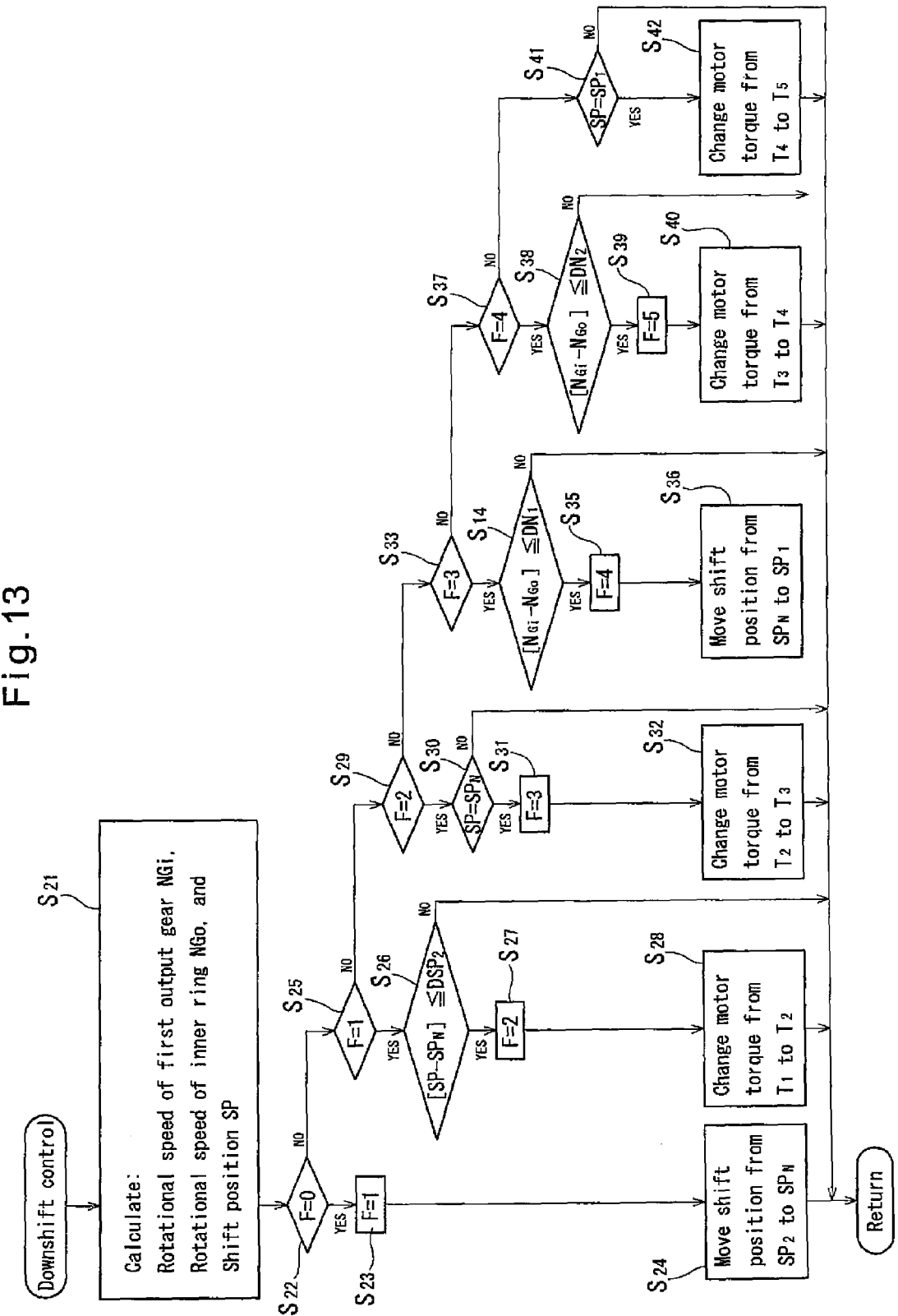
FIG. 13 is a flowchart showing the flow of downshift control by the electronic control unit shown in FIG. 11.

Specifically, in order to disengage the two-way roller clutch 30A, the electronic control unit 90 controls the electric motor 10 and the speed changing actuator assembly as shown in FIGS. 12 and 13 so as to temporarily reduce the torque being transmitted between the first output gear 23b and the inner ring 31 to zero.

FIGS. 12 and 14(A) show such control during upshift.

When the electronic control unit receives an upshift command, the electronic control unit calculates the rotational speeds of the input and output members of the higher-speed two-way roller clutch 30B (i.e. the rotational speed $N_{Gi}$ of the second output gear 24b and the rotational speed $N_{Go}$ of the inner ring 31), and the position SP of the shift fork 63, based on the signals from the first shaft rotation sensor 91, the second shaft rotation sensor 92 and the shift position sensor 93 (Step $S_1$).

Then the electronic control unit controls the speed changing actuator assembly 50 to move the first friction plate 52a away from the first output gear 23b, i.e. to move position SP of the shift fork 63 from the lower-speed shift position $SP_1$ toward a neutral shift position $SP_N$ (Steps $S_2$-$S_4$; time $t_0$ in FIG. 14(A)). The shift position $SP_1$ is the position of the shift fork 63 where the first friction plate 52a is in frictional engagement with the side of the first output gear 23b. The neutral shift position $SP_N$ is a median position between the shift position $SP_1$ and the shift position $SP_2$ where the second friction plate 52b is in frictional engagement with the side of the second output gear 24b.

While the shift fork 63 is moving toward the neutral shift position $SP_N$, the electronic control unit calculates the difference between the current shift position SP and the neutral shift position $SP_N$ and determines whether this difference is not larger than a predetermined threshold $DSP_1$ (Steps $S_5$ and $S_6$).

When this difference becomes equal to or smaller than the threshold $DSP_1$, the electronic control unit reduces the torque produced by the electric motor 10 from $T_1$ to $T_2$ (Steps $S_6$-$S_8$; time $t_1$ in FIG. 14(A)) because at this position, it is apparent that the first friction plate 52a has been separated from the side of the first output gear 23b. $T_1$ is a torque produced by the motor 10 during a normal travel mode and is a positive value. $T_2$ is a negative value, i.e. a torque that tends to decelerate the electric motor 10.

By reducing the torque of the electric motor 10 in the above manner, it is possible to reliably disengage the two-way roller clutch 30 and to quickly decelerate the electric motor 10. The torque of the electric motor 10 is controlled by adjusting the electric current applied to the motor 10, so that the motor can be decelerated far more quickly than an internal combustion engine. When the motor 10 is decelerated, the rotational speed $N_{Gi}$ of the second output gear 24b decelerates correspondingly to the electric motor 10. But the rotational speed $N_{Go}$ of the inner ring 31 remains substantially unchanged due to inertia of the vehicle. When the shift position SP reaches the neutral shift position $SP_N$, it is maintained in this position.

After the electronic control unit begins to reduce the torque of the motor 10 to $T_2$, the electronic control unit determines whether the difference between the rotational speed $N_{Gi}$ of the second output gear 24b and the rotational speed $N_{Go}$ of the inner ring 31 is not larger than a first threshold $DN_1$ (Steps $S_9$ and $S_{10}$).

When this difference becomes equal to or smaller than the first threshold $DN_1$, the electronic control unit controls the speed changing actuator assembly 50 to move the second friction plate 52b toward the second output gear 24b, i.e. to move the shift position SP of the shift fork 63 from the neutral shift position $SP_N$ toward the higher-speed shift position $SP_2$ (Steps $S_{10}$-$S_{12}$; time $t_2$ in FIG. 14(A)).

Further, when the difference between the rotational speed $N_{Gi}$ of the second output gear 24b and the rotational speed $N_{Go}$ of the inner ring 31 becomes equal to or smaller than a second threshold $DN_2$ ($<DN_1$) (Steps $S_{13}$ and $S_{14}$), the electronic control unit changes the torque of the electric motor 10 from $T_2$ to $T_3$ (which is substantially zero) and thus allows the electric motor 10 to rotate by inertia (Steps $S_{15}$ and $S_{16}$; time $t_3$ in FIG. 14(A)), because in this state, it is considered that the input and output members of the higher-speed two-way roller clutch 30B has been sufficiently synchronized with each other to engage the clutch 30B. $T_3$ needs not be strictly zero, but may be slightly larger or smaller than zero, provided the two-way roller clutch 30A is disengageable under the biasing force of the switch spring 38 when the torque of the electric motor 10 is changed to $T_3$.

When the shift position SP approaches the higher speed shift position $SP_2$ and the second friction plate 52b contacts the second output gear 24b, the two-way roller clutch 30B engages and the rotational speed $N_{Gi}$ of the second output gear 24b and the rotational speed $N_{Go}$ of the inner ring 31 become equal to each other (time $t_4$ in FIG. 14(A)). After the shift position SP of the shift fork 63 reaches the higher speed shift position $SP_2$, the electronic control unit increases the torque of the electric motor 10 from $T_3$ to $T_4$ to drive the vehicle in the higher speed ratio (Steps $S_{17}$ and $S_{18}$; time $t_5$ in FIG. 14 (A)).

During the above-described upshift control, torque of the electric motor 10 is stopped only during the period between time $t_1$ and time $t_5$ in FIG. 14(A). Thus, compared to an upshift control in which the torque of the electric motor 10 is reduced as soon as a command to upshift is received, the period during which torque of the electric motor 10 is stopped is short, because in the above-described upshift control, torque of the electric motor 10 is maintained during the period between time $t_0$ and time $t_1$.

FIGS. 13 and 14(B) show such downshift control.

When the electronic control unit receives a downshift command, the electronic control unit calculates the rotational speeds of the input and output members of the lower-speed two-way roller clutch 30A (i.e. the rotational speed $N_{Gi}$ of the first output gear 23b and the rotational speed $N_{Go}$ of the inner ring 31), and the position of the shift fork 63, based on the signals from the first shaft rotation sensor 91, the second shaft rotation sensor 92 and the shift position sensor 93 (Step $S_{21}$).

Then the electronic control unit controls the speed changing actuator assembly 50 to move the second friction plate 52b away from the second output gear 24b, i.e. to move position SP of the shift fork 63 from the higher speed shift position $SP_2$ toward the neutral shift position $SP_N$ (Steps $S_{22}$-$S_{24}$; time $t_0$ in FIG. 14(B)).

While the shift fork 63 is moving toward the neutral shift position $SP_N$, the electronic control unit calculates the difference between the current shift position SP and the neutral shift position $SP_N$ and determines whether this difference is not larger than a predetermined threshold $DSP_2$ (Steps $S_{25}$ and $S_{26}$).

When this difference becomes equal to or smaller than the threshold $DSP_2$, the electronic control unit reduces the torque produced by the electric motor 10 from $T_1$ to $T_2$ (Steps $S_{26}$-$S_{28}$; time $t_1$ in FIG. 14(B)) because at this position, it is apparent that the second friction plate 52b has been separated from the side of the second output gear 24b. $T_1$ is a torque produced by the motor 10 during a normal travel mode and is a positive value. $T_2$ is substantially zero. $T_2$ needs not be strictly zero, but may be slightly larger or smaller than zero, provided the two-way roller clutch 30B is disengageable under the biasing force of the switch spring 38 when the torque of the electric motor 10 is changed to $T_2$.

When the shift position SP reaches the neutral shift position $SP_N$, the electronic control unit increases the torque of the electric motor 10 from $T_2$ to $T_3$ to accelerate the electric motor 10 (Steps $S_{30}$-$S_{32}$; time $t_2$ in FIG. 14(B)).

After increasing the torque of the motor 10 to $T_3$, the electronic control unit determines whether the difference between the rotational speed $N_{Gi}$ of the first output gear 23b and the rotational speed $N_{Go}$ of the inner ring 31) is equal to or smaller than the first threshold $DN_1$ (Steps $S_{33}$ and $S_{34}$).

When this difference becomes equal to or smaller than the first threshold $DN_1$, the electronic control unit controls the speed changing actuator assembly 50 to move the first friction plate 52a toward the first output gear 23b, i.e. to move the shift position SP of the shift fork 63 from the neutral shift position $SP_N$ toward the lower-speed shift position $SP_1$ (Steps $S_{34}$-$S_{36}$; time $t_3$ in FIG. 14(B)).

Further, when the difference between the rotational speed $N_{Gi}$ of the first output gear 23b and the rotational speed $N_{Go}$ of the inner ring 31 becomes equal to or smaller than the second threshold $DN_2$ (Steps $S_{37}$ and $S_{38}$), the electronic control unit changes the torque of the electric motor 10 from $T_3$ to $T_4$ (which is substantially zero) and thus allows the electric motor 10 to rotate by inertia (Steps $S_{39}$ and $S_{40}$; time $t_4$ in FIG. 14(B)), because in this state, it is considered that the input and output members of the lower-speed two-way roller clutch 30A has been sufficiently synchronized with each other to engage the clutch 30A.

When the shift position SP approaches the lower speed shift position $SP_1$ and the first friction plate 52a contacts the first output gear 23b, the two-way roller clutch 30A engages and the rotational speed $N_{Gi}$ of the first output gear 23b and the rotational speed $N_{Go}$ of the inner ring 31 become equal to each other (time $t_5$ in FIG. 14(B)). After the shift position SP of the shift fork 63 reaches the lower speed shift position $SP_1$, the electronic control unit increases the torque of the electric motor 10 from $T_4$ to $T_5$ to drive the vehicle in the lower speed ratio (Steps $S_{41}$ and $S_{42}$; time $t_6$ in FIG. 14 (B)).

During the above-described downshift control, torque of the electric motor 10 is stopped only during the period between time $t_1$ and time $t_6$ in FIG. 14(B). Thus, compared to a downshift control in which the torque of the electric motor 10 is reduced as soon as a command to downshift is received, the period during which torque of the electric motor 10 is stopped is short, because in the above-described downshift control, torque of the electric motor 10 is maintained during the period between time $t_0$ and time $t_1$.

As explained above, the electronic control unit 90 maintains torque of the electric motor 10 until it determines that the friction plates 52a and 52b have moved away from the respective output gears. Thus compared to a control arrangement in which the torque of the motor 10 decreases to zero as soon as the speed changing actuator assembly 50 is actuated, the period during which torque of the electric motor 10 is stopped is short.

With this arrangement, the first two-way roller clutch 30A or the second two-way roller clutch 30B can be instantly engaged or disengaged by axially moving the shift rod 61 by driving the motor 68 as an actuator. Thus, upshift and downshift can be performed quickly.

With this arrangement, in which the control ring 51 and the first and second friction plates 52a and 52b mounted between the first and second output gears 23b and 24b, with the first and second friction plates rotationally fixed to the retainers 36 of the first and second two-way roller clutches 30A and 30B, respectively, so that the control ring 51 can be axially moved by the shift mechanism 60, whereby the two two-way roller clutches 30A and 30B can be engaged and disengaged by the single speed changing actuator assembly 50, it is possible to minimize the size of the motor drive apparatus.

While not shown, rolling bearing are preferably mounted between the control ring 51 and the respective friction plates 52a and 52b to reduce the frictional resistance between the control ring 51 and the respective friction plates 52a and 52b. This allows smooth rotation of the friction plates 52a and 52b relative to the control ring 51 when the friction plates 52a and 52b are pressed against and frictionally engage the first and second output gears 23b and 24b, respectively, which makes it possible to reliably engage the two-way roller clutches 30A and 30B.

In the embodiment, the cylindrical surfaces 33 are formed on the radially inner peripheries of the first and second output gears 23b and 24b, respectively, and the cam surfaces 34 are formed on the radially outer periphery of each of the inner rings 31, which are mounted in the respective output gears 23b and 24b. But instead, cam surfaces may be formed on the inner periphery of each of the first and second output gears 23b and 24b, and a cylindrical surface may be formed on the outer periphery of each of the inner ring. In the latter case, the switch spring is mounted between each of the first and second output gears 23b and 24b and the retainer 36 to keep the retainer such that the rollers are held in neutral positions.

The invention claimed is:

1. A motor drive apparatus for a vehicle comprising:
an electric motor;
a normally meshing type transmission comprising
first and second shafts extending parallel to each other, the first shaft being connected to the electric motor,
a plurality of gear trains each provided between the first and second shafts and having different gear ratios from each other, each of the gear trains comprising an input gear mounted on an outer periphery of the first shaft so as to rotate together with the first shaft, an output gear meshing with the input gear and mounted on an outer periphery of the second shaft so as to be rotatable relative to the second shaft, and a two-way roller clutch disposed between the output gear and the second shaft and comprising rollers and a retainer retaining the rollers and configured to be engaged and disengaged by rotating the respective retainers, wherein the first and second shafts are configured to be coupled to each other through any one of the gear trains of which the two-way roller clutch is engaged, and
a speed changing actuator assembly for engaging any selected one of the two-way roller clutches by rotating the retainer of the selected one of the two-way roller clutches, thereby coupling the first and second shafts through the gear train including the selected one of the two-way roller clutches; and
a differential gear assembly coupled to the second shaft for distributing power transmitted from the electric motor through the transmission to vehicle wheels,
wherein the two-way roller clutches each comprise an inner ring mounted between the second shaft and the output gear of the corresponding gear train and rotationally fixed to the second shaft, wherein a cylindrical surface is formed on one of a radially outer periphery of the inner ring and a radially inner periphery of the gear of the gear train such that the one of the inner ring and the gear of the gear train that has the cylindrical surface formed thereon constitutes a cylindrical surface member, and cam surfaces are formed on the other of the radially outer periphery of the inner ring and the radially inner periphery of the gear of the gear train such that the one of the inner ring and the gear of the gear train that has the cam surfaces formed thereon constitutes a cam surfaces member, thereby defining wedge-shaped spaces between the cylindrical surface and the respective cam surfaces, each wedge-shaped space narrowing toward its circumferential ends, wherein said rollers are disposed between the cylindrical surface and the respective cam surfaces, and wherein said retainer is mounted between the inner ring and the output gear of the gear train, wherein the two-way roller clutch further comprises a switch spring mounted between the retainer and one of the inner ring and the output gear of the gear train that is formed with the cam surfaces for elastically retaining the retainer in a neutral position where the rollers are in engagement with neither the cylindrical surface nor the cam surfaces,
wherein the speed changing actuator assembly comprises friction plates each rotationally fixed to the retainer of one of the two-way roller clutches and movable toward one side of one of the cylindrical surface members, elastic members each biasing one of the friction plates away from said one of the cylindrical surface members, a control ring slidably supported on said one of the first and second shafts and movable toward any one of the cylindrical surface members, thereby pressing the corresponding friction plate against the one side of said one of the cylindrical surface members, a sleeve rotatably supported around the control ring, and a shift mechanism for shifting the sleeve toward any one of the cylindrical surface members,
wherein the motor drive apparatus further comprises an electronic control unit for controlling the electric motor and the speed changing actuator assembly, said electronic control unit being configured, upon receiving a command to change gears, to actuate the speed changing actuator assembly to move one of the friction plates away from the corresponding one of the cylindrical surface members, repeatedly determine, after the speed changing actuator assembly has been actuated, whether the one of the friction plates has actually moved away from the one of the cylindrical surface members, maintain a current torque of the electric motor after the speed changing actuator assembly has been actuated, until the one of the friction plates has actually moved away from the one of the cylindrical surface members, and if the electronic control unit determines that the one of the friction plates has actually moved away from the one of the cylindrical surface members, the electronic control unit is configured to change the torque of the electric motor to a level which allows disengagement of the two-way roller clutch corresponding to said one of the friction plates, and after the two-way roller clutch corresponding to said one of the friction plates has been disengaged, the electronic control unit controls the speed changing actuator assembly to engage another one of the two-way roller clutches.

2. The motor drive apparatus of claim 1, wherein if said command to change gears is an upshift command, the electronic control unit changes the torque of the electric motor so as to decelerate the electric motor when disengaging the two-way roller clutch corresponding to said one of the friction plates.

3. The motor drive apparatus of claim 1, wherein if said command to change gears is a downshift command, the electronic control unit changes the torque of the electric motor so as to control torque transmitted between the input and output members of the two-way roller clutch corresponding to said one of the friction plates to zero when disengaging the two-way roller clutch corresponding to said one of the friction plates.

4. The motor drive apparatus of claim 1, wherein the shift mechanism comprises a shift rod extending parallel to the first and second shafts and movable in an axial direction of the shift rod, an actuator for moving the shift rod in the axial direction, and a shift fork supported by the shift rod and configured to move the control ring toward one of the cylindrical surface members together with the sleeve.

5. The motor drive apparatus of claim 1, wherein the transmission further comprises a rotary member rotationally fixed to the cam surfaces members, and engaging means for rotationally fixing the respective friction plates to the rotary member when the friction plates are out of frictional engagement with the respective cylindrical surface members.

6. The motor drive apparatus of claim 1, wherein the control ring is disposed between two adjacent ones of the gear trains, wherein two of the two-way roller clutches are mounted in said two adjacent ones of the gear trains, and wherein two of the friction plates are provided on respective sides of the control ring, and are rotationally fixed to the respective retainers of said two of the two-way roller clutches, whereby said two of the two-way rollers clutches can be selectively engaged and disengaged by the speed changing actuator assembly.

7. The motor drive apparatus of claim 1, wherein the speed changing actuator assembly further comprises a rolling bearing mounted between the control ring and the sleeve, and wherein the control ring is axially moved together with the sleeve through the rolling bearing when engaging and disengaging the two-way roller clutches.

8. The motor drive apparatus of claim 1, wherein said speed changing actuator assembly further comprises rolling bearings mounted between the respective friction plates and the control ring.

9. The motor drive apparatus of claim 4, wherein the actuator of the shift mechanism comprises a motor, and wherein the shift mechanism further comprises a motion converter for converting the rotation of the motor to axial movement of the shift rod.

10. The motor drive apparatus of claim 9, wherein the motion converter comprises a nut member rotatably supported around the shift rod and rotated by the motor, the nut member being formed with an internal thread on its inner periphery which is in threaded engagement with an external thread formed on an outer periphery of the shift rod.

11. The motor drive apparatus of claim 4, wherein the actuator of the shift mechanism comprises a cylinder connected to the shift rod.

12. The motor drive apparatus of claim 4, wherein the actuator of the shift mechanism comprises a solenoid connected to the shift rod.

13. An electric vehicle comprising a vehicle body, right and left front wheels mounted at a front portion of the vehicle body, right and left rear wheels mounted at a rear portion of the vehicle body, and the motor drive apparatus of claim 1, said motor drive apparatus being configured to drive the front wheels and/or the rear wheels.

14. A hybrid vehicle comprising a vehicle body, right and left front wheels mounted at a front portion of the vehicle body, right and left rear wheels mounted at a rear portion of the vehicle body, an engine that drives the front wheels or the rear wheels, and the motor drive apparatus of claim 1, said motor drive apparatus being configured to drive the front wheels or the rear wheels that are not driven by the engine.

* * * * *